May 30, 1950 A. COOK ET AL 2,509,212

FREQUENCY SHIFT RADIO TELEGRAPH SYSTEM

Filed March 1, 1947

Inventor
Arthur Cook.
Herbert Dunn Bickley
By
Robert Harding Jr.
Attorney

Patented May 30, 1950

2,509,212

UNITED STATES PATENT OFFICE 2,509,212

FREQUENCY SHIFT RADIO TELEGRAPH SYSTEM

Arthur Cook, Clapham, London, and Herbert Dunn Bickley, Welwyn Garden City, England, assignors to International Standard Electric Corporation, New York, N. Y.

Application March 1, 1947, Serial No. 731,826
In Great Britain February 5, 1946

Section 1, Public Law 690, August 8, 1946
Patent expires February 5, 1966

4 Claims. (Cl. 250—8)

This invention relates to carrier-wave telegraph systems of the kind in which signals are sent by changing the frequency of the emitted wave.

In such systems unwanted frequency changes may occur either in the transmitter or the receiver and it is usual to provide at the receiver arrangements for compensating for such unwanted frequency variations, by correcting the tuning of the receiver. It is, however, necessary to arrange that the correcting device is not affected by the changes of frequency due to signalling but only by unwanted changes, and the usual arrangement is to allow only one of the frequencies used in signalling to control the correcting device through a circuit so arranged that the control is quickly established when this frequency is received but dies away comparatively slowly at the cessation of the receipt of said frequency.

According to one feature of the present invention we provide a receiver for a carrier wave telegraph system of the kind specified in which means is provided for correcting, for unwanted changes in freqency during the reception of any of the frequencies used in the system.

According to another feature of the present invention we provide a receiver for a carrier wave telegraph system of the kind specified in which means is provided for controlling the tuning of the receiver by means of a portion of the energy received during the reception of one of the frequencies used in the system and means is also provided for altering the frequency of a portion of the energy received during the reception of another of the frequencies received and for using also the energy of said altered frequency to control the tuning of the receiver.

The invention will be more fully understood from the following description taken in conjunction with the accompanying drawings, in which.

Figure 1:
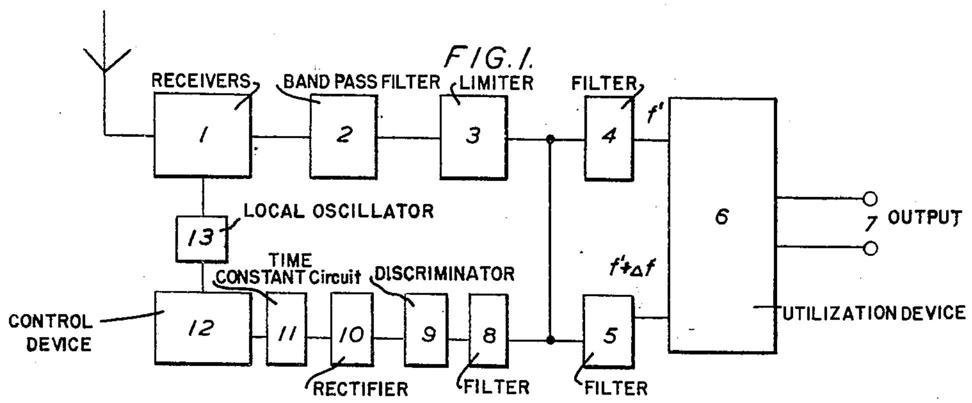
Fig. 1 is a schematic diagram of a known receiver of the kind to which this invention relates.

Referring to the drawings, the receiver shown in Fig. 1 is a receiver for a radio telegraph system of the kind in which Morse code signalling takes place by the use of frequencies $f$ and $f\pm\Delta f$. The frequency $f$ is emitted from the transmitter during idle periods, and is called the spacing frequency and during signalling the frequency is changed to $f\pm\Delta f$ for the duration of the marking elements of the code, returning to the value $f$ for the duration of each spacing element of the code.

The signals are passed from the antenna to a receiver 1 of the superheterodyne type 13 being the local oscillator associated with a frequency changer in the receiver 1. The signals at the changed frequency are passed through a band pass filter 2 in order to eliminate unwanted frequencies and thus improve the signal to noise ratio, and then through a limiter 3 the purpose of which is to remove variations in amplitude of the signals. After passing through the limiter 3 the signals are passed to filters 4 and 5 in parallel which select the frequencies $f'$ and $f'\pm\Delta f$ which are those frequencies to which the spacing and marking frequencies $f$ and $f\pm\Delta f$ respectively are changed by the frequency changer stage 1. The frequencies $f'$ and $f'\pm\Delta f$ are then passed to the device 6 wherein the signals are converted into D. C. signals passed to an output 7. From the output of limiter 3, a small band of frequencies on either side of frequency $f'$ is selected by a filter 8, which, however, rejects the frequency $f'\pm\Delta f$. The output of filter 8 is passed through a discriminator 9 and rectified by a rectifier 10. At the output of rectifier 10 a steady potential difference appears of amplitude dependent upon the precise value of the frequency $f$ of the spacing signal. This D. C. potential is applied through a time constant circuit 11 to a control device 12 whereby the frequency of the local oscillator 13 is made to vary in the proper sense to correct for the variation in the frequency at the output of filter 8. The time constant of circuit 11 is of such value that any steady potential difference applied to the control device 12 will persist for the duration of a marking element provided that this is not of too long duration.

The above described arrangement suffers from various disadvantages. The magnitude of the time-constant of the circuit 11 limits the maximum rate of change of frequency which can be dealt with by the correcting device. Moreover a change of frequency occurring during a marking period goes uncorrected. This is particularly disadvantageous if it be required to send long marking signals, e. g. of several seconds duration as may be required to operate remote control devices in certain tape facsimile systems of telegraphy. If the time constant of circuit 11 is made sufficiently long to hold the frequency of the local oscillator 13 at the same value throughout such a long marking period, then the rate of frequency correction becomes very low, and if this time constant is not long enough for this purpose, then the circuits remain entirely uncorrected for some period of time. In either event the correcting device may lose control and the receiver may adjust itself to an unwanted signal on a neighbouring frequency channel.

Conditions in which long marking periods occur are also met if it be required to signal by hand-speed Morse, and this is sometimes required even over telegraph circuits normally used for higher speed working by Morse, teleprinter or other code.

Figure 2:
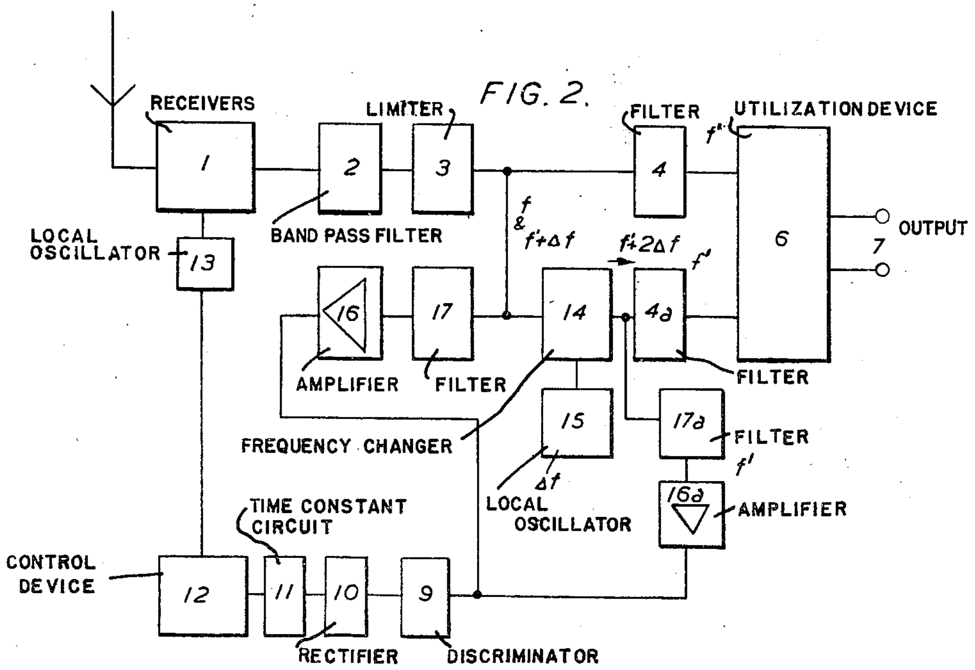
Fig. 2 is a schematic diagram of a receiver similar to that of Fig. 1 but arranged in accordance with the present invention.

The above mentioned difficulties are overcome by the arrangement shown in Fig. 2 which shows one embodiment of the invention as applied to a receiver similar to that of Fig. 1. As before a superheterodyne receiver 1 is used, with a local oscillator 13 connected to a band pass filter 2 and limiter 3. The filter 4 selects the frequency $f'$ in the same way as in Fig. 1 but instead of part of the output of limiter 3 going to filters 5 and 8, it goes to filter 17 and a frequency changer 14. A local oscillator 15 is associated with the frequency changer 14, the frequency thereof being made equal to $\Delta f$. The frequency changer 14 is connected to filters 4a and 17a. Filter 4a has a band pass characteristic the same as that of filter 4 i. e. both filters 4 and 4a select the frequency $f'$.

When the spacing frequency $f$ is received, the frequency at the input of frequency changer 14 will be $f'$ and the frequencies at the output thereof will be $f'+\Delta f$ and $f'-\Delta f$. Neither of these is passed by filter 4a and thus the device 6 is affected only on the spacing side i. e. at the output of filter 4.

Filters 17 and 17a have pass characteristics similar to that of filter 8 of Fig. 1 i. e. each passes a band of frequencies centered on frequency $f'$, but will not pass either $f'+\Delta f$ or $f'-\Delta f$. During the receipt of spacing frequency $f$, filter 17 passes a portion of the output from limiter 3, and this, after passing through an amplifier 16 or other suitable one-way device, is used as in Fig. 1 to operate the control device 12. No energy of frequency $f'$ however, reaches filter 17a.

When the marking frequency $f\pm\Delta f$ is received, the output of frequency changer 1 is $f'\pm\Delta f$ and no energy passes the filter 4 or the filter 17. The frequencies at the output of frequency changer 14 are $f'+\Delta f+\Delta f$ and $f'+\Delta f-\Delta f$ i. e. $f'+2\Delta f$ and $f'$ in the one case (if the marking frequency is $f+\Delta f$) or $f'-\Delta f+\Delta f$ and $f'-\Delta f-\Delta f$ i. e. $f'$ and $f'-2\Delta f$ in the other case (if the marking frequency is $f-\Delta f$). The frequency $f'$ passes filter 4a and is passed to the device 6 as the marking frequency. The frequency $f'$ also passes filter 17a and after passing through an amplifier or other suitable one-way-device 16a is applied to the control device 12 in the same way as is the output of filter 17 during spacing periods.

The correction for unwanted frequency changes thus takes place both during spacing and marking periods and the time-constant of the circuit 11 can be made much shorter than in the case of Fig. 1. The purpose of the one-way devices 16 and 16a is to enable the outputs of filters 17 and 17a to be both connected to the input of the limiter 9.

It should be noted that it is essential that, if an unwanted change of frequency $\delta f$ should occur the corresponding change in frequency at the output of the frequency changer 14 should be identical in sense with this original unwanted change. This is secured in this embodiment of the invention by setting the frequency of the oscillations produced by oscillator 15 to be $\Delta f$, the difference between the spacing and marking frequencies. Thus if frequencies $f'$ and $f+\Delta f$ at the output of frequency changer 1 should change to $f'+\delta f$, and $f'+\Delta f+\delta f$ the frequency $f'+\Delta f+\delta f$ will be changed in frequency changer 14 to $f'+\delta f$.

The frequency $f'+\Delta f$ can be changed to frequency $f'$ by setting the frequency of oscillator 15 to be $2f'+\Delta f$ but in this case an unwanted frequency $f'+\Delta f+\delta f$ is changed to $f'-\delta f$.

The band-width of filters 17 and 17a can with advantage be greater than that of filters 4 and 4a. In many cases it may be desirable to keep the band-width of these latter filters as narrow as is practicable in order to exclude noise interference, but the band-width of filters 17 and 17a is advantageously made wider to allow of automatic correction of wide changes of frequency in the signals. The bandwidth of each of the filters 17 and 17a may extend from $f'-\frac{1}{2}\Delta f$ to $f'+\frac{1}{2}\Delta f$.

It should also be noted that the circuit of Fig. 2 has a further advantage over that of Fig. 1 in that fewer changes are required if it be desired to receive a transmission in which the frequency change between spacing and marking is some other value than $\Delta f$, say $\varphi f$. In Fig. 2 it is only necessary for this purpose to change the frequency of the local oscillator 15 to $\varphi f$, the filters 4 and 4a and, in most cases, filters 17 and 17a remaining unchanged.

It will be clear that the invention is applicable to systems in which the signals are constituted by three or more conditions.

What is claimed is:

1. A receiver for frequency shift marking and spacing carrier waves comprising a frequency changer, said frequency changer comprising a first local oscillator for mixing with received waves for providing intermediate frequency waves, a plurality of electrical paths connected in parallel to the output of said frequency changer, a utilization device, a first one of said paths comprising a first band pass filter for passing intermediate frequency waves of one frequency to said utilization device, a second band pass filter for passing said intermediate frequency waves of one frequency, a second one of said paths comprising a frequency changer having a second local oscillator generating waves of a frequency equal to the difference between the marking and spacing frequencies, means for mixing said intermediate frequency waves with said local oscillator waves, a third and a fourth band pass filter in parallel coupled to the output of said mixing means, a means connecting the output of the third band pass filter to said utilization device, means for applying the outputs of the second and the fourth band pass filters to a common electrical path for correcting the tuning of said first local oscillator, the center pass frequency of all of said band pass filters being the same.

2. Receiver as claimed in claim 1 in which the pass bands of said first and third band pass filters are identical.

3. Receiver as claimed in claim 1 in which the pass bands of said second and fourth band pass filters are identical and are wider than the pass band of said first and third band pass filters.

4. A receiver for frequency shift carrier waves of two different signal frequencies comprising a first local oscillator, means for mixing waves from said local oscillator with received carrier waves to provide intermediate frequency waves, four filter circuits for passing intermediate frequency waves corresponding to one signal frequency, a utilization device, a second local oscillator tuned to the difference circuit frequency between said signals, a tuning control circuit for said first named local oscillator, means for mixing said intermediate frequency waves with said second local oscillator, means for applying said mixed waves through one of said filters to said utilization device and through a second filter to said tuning control circuit, means for applying said intermediate frequency waves through a third filter to said utilization device and through a fourth filter to said tuning control circuit.

ARTHUR COOK.
HERBERT DUNN BICKLEY.

REFERENCES CITED

The following references are of record in the file of this patent:

UNITED STATES PATENTS

| Number | Name | Date |
|---|---|---|
| 1,642,173 | Round | Sept. 13, 1927 |
| 2,108,899 | Peterson | Feb. 22, 1938 |
| 2,211,750 | Humby et al. | Aug. 20, 1940 |
| 2,232,390 | Katzin | Feb. 10, 1941 |
| 2,253,832 | Whitaker | Apr. 26, 1941 |
| 2,316,017 | Peterson | Apr. 6, 1943 |
| 2,341,649 | Peterson | Feb. 15, 1944 |
| 2,358,448 | Earp | Sept. 19, 1944 |
| 2,384,456 | Davey | Sept. 11, 1945 |
| 2,401,355 | Hysko | June 4, 1946 |
| 2,433,350 | Earp | Dec. 30, 1947 |